United States Patent [19]

Glagola

[11] 4,044,220
[45] Aug. 23, 1977

[54] RESISTANCE WELDING ELECTRODE AND METHOD OF MAKING

[75] Inventor: Michael A. Glagola, Richmond, Va.

[73] Assignee: Reynolds Metals Company, Richmond, Va.

[21] Appl. No.: 613,611

[22] Filed: Sept. 15, 1975

[51] Int. Cl.$^2$ ............................................. B23K 11/30
[52] U.S. Cl. .................................... 219/119; 219/118
[58] Field of Search ................. 29/199; 219/118, 119, 219/120, 76, 77, 128

[56] References Cited

U.S. PATENT DOCUMENTS

| | | | |
|---|---|---|---|
| 2,588,421 | 3/1952 | Shepard | 29/199 |
| 3,665,145 | 5/1972 | Engel | 219/119 |
| Re. 22,398 | 11/1943 | Meduna | 219/76 X |

OTHER PUBLICATIONS

Metals Handbook, "Heat Treating, Cleaning and Finishing," American Society for Metals, Metals Park, Ohio, pp. 398–405.

Primary Examiner—J. V. Truhe
Assistant Examiner—N. D. Herkamp
Attorney, Agent, or Firm—Glenn, Lyne, Gibbs & Clark

[57] ABSTRACT

In a method of making a resistance welding electrode of the type having a copper or copper-base alloy body member and a coating on a surface portion of the body member, the coating defining an outer work-contacting surface of the electrode, and the coating being of a material selected from the group consisting of nickel, berylium, cobalt, iron and high melting point alloys of the foregoing, the improvement wherein the coated surface portion of the body member is shot-peened prior to coating.

33 Claims, No Drawings

RESISTANCE WELDING ELECTRODE AND METHOD OF MAKING

BACKGROUND

This invention relates to resistance welding and, more particularly, to that area of the art wherein two work-contacting electrodes are utilized, including such various forms as spot welding and seam, stitch and roller welding, and projection welding.

In resistance welding generally, the faying surfaces of the electrically conducting members to be joined are superimposed under pressure. The fusion or coalescence of these surfaces is accomplished by flowing an electric current through a circuit of which the work is a part. In the form of resistance welding of specific concern herein, electrical contact with the work is made, and the loading thereof is typically provided, by means of two opposed electrodes.

As is well appreciated in the art, substantial problems are often encountered on account of surface contamination of the work. Such is especially the case where the work is of an aluminous material, the same typically being quite prone to oxidation on exposure.

Where the outer exposed surfaces of the work are oxidized or otherwise contaminated, the number of acceptable welds obtainable between electrode dressing or replacement can be expected to decrease considerably. Consequently, much attention has heretofore been directed toward providing a cleaning of the work prior to welding.

Apart from the problems associated with contamination, the art has also been concerned about certain inconveniences caused by the tendency of the metal of the work to diffuse into the work-contacting surface portion of a conventional copper or copper-base alloy electrode. One effort to overcome such inconveniences was proposed in U.S. Pat. No. 3,665,145 to H. J. Engel, the disclosure of which is hereby incorporated by reference. According to the Engle patent, a conventional electrode can be improved through forming a work-contacting layer thereon by coating the appropriate surface portion of the electrode with a material selected from the group consisting of nickle, berylium, cobalt, iron and high melting point alloys of the foregoing.

While the teachings contained in the Engel patent are alleged to be of substantial importance in connection with the inconveniences caused by diffusion, experiments have shown that they are of little consequence in respect of the distinct set of problems brought on by contamination. In other words, mere obedience to the principles set forth in the Engel patent has not proved to be an effective substitute for the removal of contamination from the work.

What has now been discovered is that a shot-peening of the appropriate surface portion of a conventional electrode reacts synergically with the subsequent application of a coating thereto as taught by Engel, the result being an improved electrode having a substantially greater comparative useful life when subjected to the welding of contaminated work.

Without wishing to become bound thereby, it is theorized that this result is achieved for two reasons. First, the shot-peening is believed to work-harden the affected electrode surface and thereby make it more resistant to deformation which is known to have an adverse impact on weld quality. Such deformation, it is believed, is typically advanced by contamination due to the annealing effect of the resultant increase of localized heating. Secondly, it is conjectured that the shot-peening provides the affected electrode with multitudinous indentations, thus leaving a plurality of relatively sharp ridges intermediate to adjacent indentations. Such ridges, it is believed, may substantially pierce the contamination layer on the work so as to effectively avoid its ramifications. As for the role played by the coating, no explanation is guessed at outside of the teachings supplied by Engel.

SUMMARY OF THE INVENTION

This invention generally includes certain improved features in combination with a heretofore recognized species of resistance welding electrodes wherein a conventional copper or copper-base alloy electrode, hereinafter referred to as a body member, has a surface portion provided with a coating which defines an outer work-contacting electrode surface, the coating being of a material selected from the group consisting of nickel, berylium, cobalt, iron and high melting point alloys of the foregoing.

In accordance with the invention in its broadest sense, the principal improved feature is a body member whose surface portion to be coated is characterized essentially as if it had been shot-peened. That is to say, the invention includes an appropriately coated body member whose surface portion beneath the coating has such characteristics as may be provided by shot-peening or any other process productive of a like result. In that connection, it is believed, but not stipulated, that exemplary of such characteristics is a work-hardened surface having multitudinous indentations (and thus multitudinous relatively sharp ridges or protuberances).

The invention also includes an embodiment which has been found especially suited for the welding of aluminous materials. Specifically, the embodiment comprises a shot-peened body member, or its equivalent, in combination with a coating of nickel, and more particularly, a coating of nickel having a dull finish such as the kind achievable by electroplating in the absence of brightening agents.

In respect of the foregoing embodiment, it has been discovered that the thickness of the coating has a substantial effect on the results to be obtained. Accordingly, the presently preferred range for the thickness of the nickel coating for welding aluminous materials is from about 0.00001 to about 0.001 inches; and more particularly, a thickness of about 0.00007 inches is presently desired.

Again in respect of the foregoing embodiment, it has further been discovered that when shot-peening is used to condition the body member, of some significance is the shape, size, material and momentum of the shot. Accordingly, of present preference is substantially spherical shot of aluminum oxide. having an average size corresponding to about 54 mesh, when blasted by means of an air pressure differential of about 65 psi.

Other details, used and advantages of the invention will become more apparent as the invention is hereinafter described in detail and particularly pointed out in the claims.

DETAILED DESCRIPTION

As required, detailed embodiments of the invention are herein disclosed. However, it is to be understood that these embodiments are merely exemplary and therefore are not to be construed as limiting. For example, while an improved electrode for the welding of aluminous materials is described in particular, the invention may yet embrace other forms as should be obvious from the disclosure as a whole.

Referring now to the body member of the resistance welding electrode of this invention, it is contemplated that the various principles under discussion are generally applicable to conventional shapes such as are known in the arts of spot welding and seam, stitch and roller welding. Typically, the body member will be of copper or a copper-base alloy, although other materials are possible.

In accordance with the teachings of this invention, the surface portion of the body member which will be workproximate in use is conditioned to have such characteristics as are attainable by shot-peening. The pertinent characteristics can, for example, be imparted in practice by shot-peening the body member surface portion prior to the application of the coating thereto.

As has been mentioned the invention requires a coating in combination with the conditioned body member, the coating being applied to define an outer work-contacting surface of the electrode. Suitable materials for the coating include nickel, berylium, cobalt, iron and high melting point alloys thereof. The coating can be applied by any known technique, such as is taught in the incorporated disclosure of Engel.

Where the invention is to be used for welding aluminous materials, it is presently preferred that the coating be of nickel. Here electroplating with a standard Watts bath has proved to be an ideal coating method. Moreover, it should be emphasized that the best results have been realized when such additives as brightening and leveling agents have been omitted from the bath so as to produce a nickel coating having a dull finish.

For more specific details of an exemplary embodiment of the invention together with the various advantages thereof, reference is now made to the following examples:

EXAMPLE 1

In the experiments of this example, sheets of 0.040 inch thick 2036-T4 mill finished aluminum sheet were spot welded. No attempt was made to remove oxide from or otherwise clean the sheet prior to welding.

The machine used was a 100 KVA air-operated press-type spot welder using Sciaky synchronous controls, and water cooled electrodes. The welding circuit utilized 60 Hz 440 volt mains with secondary rectification. A single-squeeze cycle was used in all tests.

Essentially the experiments were run by subjecting a given set of electrodes to successive spot welding operations until an appreciable decline in weld quality was noticed. This point was reached when less than 75% of 100 consecutive welds produced a full-height nugget on peeling apart the sheets.

In the basic experiment, Class I, ⅜ inch D, 3 inch R tip, copper electrodes were each shot-peened and given a 0.00007 inch coating of dull nickel.

Shot-peening was carried out using a Trinco-Dryblast Master Model 48 bead blaster manufactured by Trinity Tool Co., 25140 Easy Street, Warren, Mich. The blaster was operated with an air line pressure of about 65 psi and used Trin-Blast 54 mesh aluminum oxide beads, also manufactured by Trinity Tool Co.

Subsequently, the shot-peened electrodes were electroplated with nickel pursuant to an approximate two minute immersion in a Watts bath, the composition and operational parameters of which are summarized as follows:

| Composition | |
|---|---|
| Nickel Sulfate ($NiSO_4 \cdot 6H_2O$) | 32 Oz/gal. |
| Nickel Chloride ($NiCl_2 \cdot 6H_2O$) | 6 Oz/gal. |
| Boric Acid ($H_3BO_3$) | 4 Oz/gal. |
| Operational Parameters | |
| Temperature | 135° F |
| pH | 5.2 |
| Current Density | 30 amp/ft$^2$ |

In the course of the basic experiment some 2000 successful welds were obtained prior to the concluding decline in weld quality.

As a first control measure, the experiment was repeated under approximately identical conditions except that the electrodes were neither shot-peened nor coated. Here only about 750 welds were obtained.

A second control measure was taken repeating the conditions of the basic experiment except that the electrodes were not coated. In that case only about 900 welds were obtained.

Finally, the basic experiment was repeated except that the electrodes were not shot-peened. In that run the number of successful welds was only about 750.

EXAMPLE 2

The subject of this example is an effort made to ascertain the criticality of the thickness of the nickel coating. Accordingly, the basic experiment of Example 1 was repeated except that the plating thickness was varied at 0.0015, 0.0010, 0.00020, 0.00010, 0.00004 and 0.00002 inches. The number of successful welds respectively achieved at each thickness were 20, 100, 1600, 1500, 760 and 1000. Quite clearly the 2000 welds in Example 1 for a 0.00007 inch thickness represent the best result in comparison.

EXAMPLE 3

In the experiment of this example the purpose was to establish the importance of the type of nickel finish. Thus the basic experiment of Example 1 was repeated except that a brightening agent was added to the bath. In that run, the operation had to be halted after 40 welds on account of metal plugs being pulled out of the work by the electrodes.

EXAMPLE 4

The purpose of the tests in this example was to determine the significance of the size of shot utilized for shot-peening. Again, the basic experiment of Example 1 was repeated except that 100 mesh, 36 mesh and 24 mesh aluminum oxide beads were all used. Although about 2000 welds were obtained in each instance, it was found that the electrodes showed signs of various degrees of pitting, a problem which was not encountered in the course of the basic experiment.

While various exemplary embodiments of the invention as well as methods of practicing the same have been described, it is to be understood that the invention may be still otherwise embodied and practiced within the scope of the following claims.

What is claimed is:
1. A method for forming work-contacting layer on a surface portion of a copper or copper-base alloy body member of a resistance welding electrode, which comprises the steps of:
  a. shot-peening said surface portion of said body member and
  b. coating said surface portion of said body member with a material selected from the group consisting of nickel, berylium, cobalt, iron and high melting point alloys of the foregoing.

2. A resistance welding electrode having a work-contacting layer formed in accordance with the method of claim 1.

3. The method of claim 1, wherein said surface portion of said body member is coated with nickel.

4. The method of claim 3 wherein said surface portion of said body member is coated with nickel having a dull finish.

5. A resistance welding electrode having a work-contacting layer formed in accordance with the method of claim 4.

6. The method of claim 4 wherein said surface portions of said body member is coated with nickel to a thickness within the range of about 0.00001 to about 0.001 inches.

7. A resistance welding electrode having a work-contacting layer formed in accordance with the method of claim 6.

8. The method of claim 6 wherein said surface portion of said body member is shot-peened by substantially spherical shot blasted by means of an air pressure differential of about 65 psi, said shot being of aluninum oxide and having an average size corresponding to about 54 mesh.

9. A resistance welding electrode having a work-contacting layer formed in accordance with the method of claim 8.

10. The method of claim 6 wherein said surface portion of said body member is coated with nickel to a thickness of about 0.00007 inches.

11. A resistance welding electrode having a work-contacting layer formed in accordance with the method of claim 10.

12. A method for forming work-contacting layer on a surface portion of a copper or copper-base alloy body member of a resistance welding electrode, which comprises the steps of:
  a. shot-peening said surface portion of said body member and
  b. coating said surface portion of said body member by electroplating with a material selected from the group consisting of nickel, berylium, cobalt, iron and high melting point alloys of the foregoing.

13. A resistance welding electrode having a work-contacting layer formed in accordance with the method of claim 12.

14. The method of claim 12 wherein said surface portion of said body member is coated with nickel.

15. The method of claim 14 wherein said surface portion of said body member is coated with nickel having a dull finish.

16. A resistance welding electrode having a work-contacting layer formed in accordance with the method of claim 15.

17. The method of claim 15 wherein said surface portion of said body member is coated with nickel to a thickness within the range of about 0.00001 to about 0.001 inches.

18. A resistance welding electrode having a work-contacting layer formed in accordance with the method of claim 17.

19. The method of claim 17 wherein said surface portion of said body member is shot-peened by substantially spherical shot blasted by means of an air pressure differential of about 65 psi, said shot being of aluminum oxide and having an average size corresponding to about 54 mesh.

20. A resistance welding electrode having a work-contacting layer formed in accordance with the method of claim 19.

21. The method of claim 17 wherein said surface portion of said body member is coated with nickel to a thickness of about 0.00007 inches.

22. A resistance welding electrode having a work-contacting layer formed in accordance with the method of claim 21.

23. A method for forming work-contacting layer on a surface portion of a copper or copper-base alloy body member of a resistance welding electrode, which comprises the steps of:
  a. shot-peening said surface portion of said body member and
  b. coating said surface portion of said body member by electroless deposition with a material selected from the group consisting of nickel, berylium, cobalt, iron and high melting point alloys of the foregoing.

24. A resistance welding electrode having a work-contacting layer formed in accordance with the method of claim 23.

25. The method of claim 23 wherein said surface portion of said body member is coated with nickel.

26. The method of claim 25 wherein said surface portion of said body member is coated with nickel having a dull finish.

27. A resistance welding electrode having a work-contacting layer formed in accordance with the method of claim 26.

28. The method of claim 26 wherein said surface portion of said body member is coated with nickel to a thickness within the range of about 0.00001 to about 0.001 inches.

29. A resistance welding electrode having a work-contacting layer formed in accordance with the method of claim 28.

30. The method of claim 28 wherein said surface portion of said body member is shot-peened by substantially spherical shot blasted by means of an air pressure differential of about 65 psi, said shot being of aluminum oxide and having an average size corresponding to about 54 mesh.

31. A resistance welding electrode having a work-contacting layer formed in accordance with the method of claim 30.

32. The method of claim 28 wherein said surface portion of said body member is coated with nickel to a thickness of about 0.00007 inches.

33. A resistance welding electrode having a work-contacting layer formed in accordance with the method of claim 32.

* * * * *